United States Patent [19]

Miller et al.

[11] 4,173,157

[45] Nov. 6, 1979

[54] MOTION TRANSMITTING REMOTE CONTROL ASSEMBLY

[75] Inventors: Donald M. Miller, Pontiac; Grant A. Webb, West Bloomfield, both of Mich.

[73] Assignee: Teleflex Incorporated, Limerick, Pa.

[21] Appl. No.: 896,319

[22] Filed: Apr. 14, 1978

[51] Int. Cl.² ............................................. F16C 1/10
[52] U.S. Cl. ................................. 74/501 R; 277/30; 277/24; 15/256.6
[58] Field of Search .................... 15/256.6; 166/82, 83, 166/84; 175/84; 277/24, 30, 97; 16/2; 74/501 R, 501 P, 501 M

[56] References Cited

U.S. PATENT DOCUMENTS

| 1,655,159 | 1/1928 | Parrish | 166/84 |
|---|---|---|---|
| 1,936,161 | 11/1933 | Evans | 122/4R |
| 2,229,071 | 1/1941 | Godstrey | 15/256.6 |
| 2,717,792 | 9/1955 | Pelley | 277/97 |
| 3,572,159 | 3/1971 | Tschanz | 74/501 P |

FOREIGN PATENT DOCUMENTS 1064678  3/1957  France ..................................... 277/30

*Primary Examiner*—Samuel Scott
*Assistant Examiner*—G. A. Anderson
*Attorney, Agent, or Firm*—McGlynn and Milton

[57] ABSTRACT

A motion transmitting remote control assembly of the type for transmitting forces along a curved path by a flexible motion transmitting core element movably supported within a conduit. The core element is a stranded cable-like member having a first end extending from a support member secured to the conduit and supported by a support structure. A terminal member is disposed on the end of the core element and is operatively attached to a control member. The support member includes a male spherical end portion and a wiper means comprising a female spherical member is snapped onto the male spherical portion for swivelling movement. The female spherical member is in wiping engagement with the core element for preventing foreign matter on the extended length of the core element from entering into the conduit upon movement of the core element while at the same time allows the axis of the extended length of the core element to move in a conical area.

10 Claims, 2 Drawing Figures

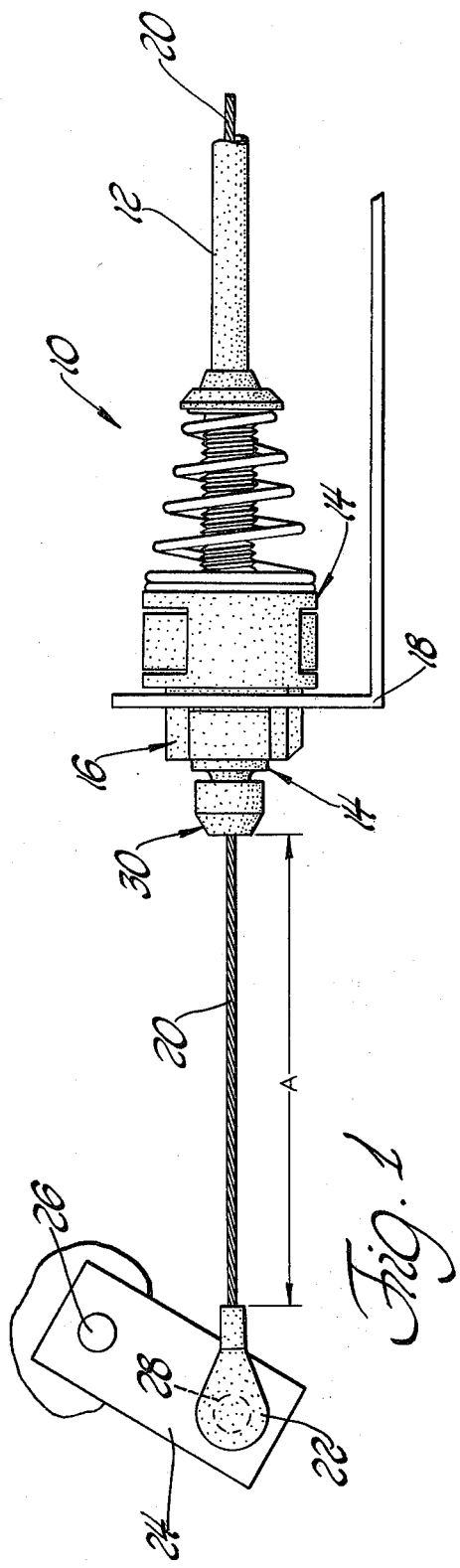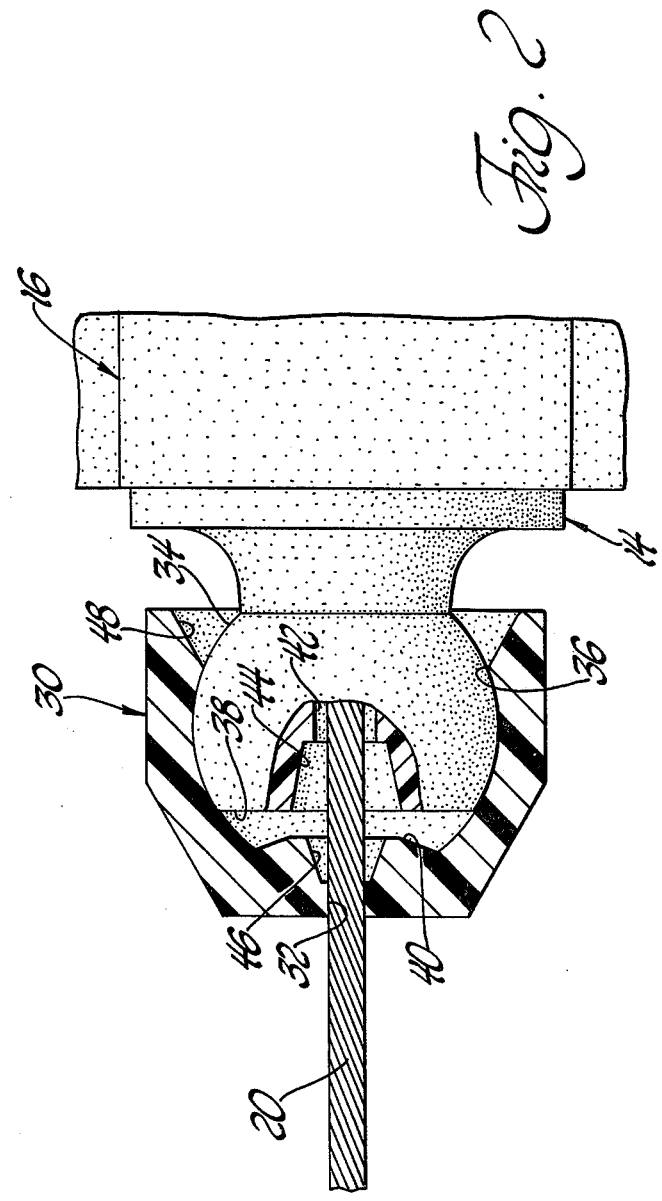

MOTION TRANSMITTING REMOTE CONTROL ASSEMBLY

BACKGROUND OF THE INVENTION (1) Field of the Invention

The subject invention relates to a motion transmitting remote control assembly of the type for transmitting forces along a curved path by a flexible motion transmitting core element movably supported within a guide means such as a conduit. The embodiment of the subject invention which is illustrated and described herein is particularly suitable as a throttle control cable utilized in an automobile with an automatic transmission for interconnecting the throttle and transmission to control shifting of the transmission.

(2) Description of the Prior Art

The remote control assemblies utilized to interconnect the throttle and transmission of an automobile typically include a rigid extension from the support member in which the cable is movably supported with an umbrella or tubular member secured to the end of the core element and slidably disposed over the rigid extension to act as a dust cover to prevent foreign matter from engaging the cable and entering into the conduit. There are other motion transmitting remote control assemblies which include means for preventing foreign matter from reaching the interior of the conduit but none suitable for the specific type of control assembly mentioned above.

SUMMARY OF INVENTION

The subject invention relates to a motion transmitting remote control assembly for transmitting forces along a curved path by a flexible motion transmitting core element movably supported in a guide means. The first end of the core element extends from the guide means to provide a variable extended length of the core element between the guide means and the first end of the core element with a terminal means disposed on the first end of the core element for operatively attaching the core element to a control member and with a wiper means supported by the guide means for swivelling movement relative thereto and in wiping engagement with the core element for preventing foreign matter on the extended length of the core element from entering the guide means upon movement of the core element and whereby the axis of the extended length of the core element may move in a conical area as allowed by the swivelling movement.

PRIOR ART STATEMENT

Typical of a motion transmitting remote control assembly of the type to which the instant invention pertains is that shown in U.S. Pat. No. 3,572,159 granted to A. E. Tschanz on Mar. 23, 1971. That patent discloses a relatively rigid tubular extension extending from a support member with the core element slidably supported therein. A tubular member or umbrella is disposed over the extension in sliding engagement therewith and is secured to a coupling member attached to the end of the core element. The subject invention is an improvement thereover by eliminating the tubular extension and the tubular umbrella which are in telescopic relationship with one another and substituting a singular wiper means swivably supported and in wiping engagement with the core element.

U.S. Pat. No. 1,936,191 granted Mar. 21, 1933 to E. R. Evans discloses a motion transmitting remote control assembly which includes a dust cap surrounding the core element. However, such dust caps are not supported by the guide means for the core element for swivelling movement while being in wiping engagement with the core element whereby the axis of the extended length of the core element from the guide means may move in a conical area.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a fragmentary side elevational view showing a preferred embodiment of the subject invention; and FIG. 2 is an enlarged fragmentary cross-sectional view of a portion of the embodiment shown in FIG. 1.

DESCRIPTION OF PREFERRED EMBODIMENT

A motion transmitting remote control assembly of the type for transmitting forces along a curved path by a motion transmitting core element is generally shown at 10. The motion transmitting remote control assembly 10 includes a guide means comprising a flexible conduit 12 and an end support member generally indicated at 14. The end support member 14 is secured to the conduit 12 as by being molded thereto, both parts being made of an organic polymeric or plastic material. The support member 14 includes attachment means generally indicated at 16 for attachment to a support structure such as the bracket 18. Preferably, the end support member 14 is made of an organic polymeric material which is more rigid or inflexible than the organic polymeric material of which the conduit 12 is made. Also, the conduit 12 is of the type including an inner tubular member with long lay wires disposed about the inner tubular member and a casing disposed about the long lay wires and the inner tubular member with the casing and inner tubular member being of organic polymeric material. Additionally, the support member 14 is of the type specifically disclosed and claimed in U.S. Pat. No. 3,572,159 granted in the name of A. E. Tschanz on Mar. 23, 1971.

A flexible motion transmitting core element 20 is movably supported by the guide means which comprises the conduit 12 and the end support member 14. The motion transmitting core element 20 is cable-like in that it comprises metal strands helically wound together. It will be understood, however, that the core element 20 may take many different forms as, for example, it may be wire-like. Although not shown, the end of the core element 20 will extend from the end of the conduit 12 or another support member and include means for attachment to a control member. A first end, as illustrated, extends from the support member 14 of the guide means to provide a variable extended length A of the core element 20 between the support member 14 of the guide means and the first end which includes terminal means 22. The terminal means 22 is disposed on the first end of the core element 20 for operatively attaching the core element 20 to a controlled member or lever 24. The member 24 is supported upon a shaft 26 whereby, upon longitudinal movement of the core element 20 parallel to its axis, the lever or control member 24 will be rotated to rotate the shaft 26. The terminal means 22 is attached to the control member 24 by a projection 28.

The assembly also includes a wiper means generally indicated at 30. The wiper means 30 is supported by the support member 14 of the guide means for swivelling movement relative thereto and is in wiping engagement through the passageway 32 with the core element 20 for preventing foreign matter on the extended length A of the core element from entering the guide means upon movement of the core element 20 and whereby the axis of the extended length of the core element 20 may move in a conical area as allowed by the swivelling movement. As will be appreciated, the axis of the extended length A of the core element 20 will move angularly through an arc as the member 24 moves. Although the movement of the lever 24 controls the area of movement of the extended length A of the core element 20, it will be appreciated that the extended length A of the core element 20 may move in a conical area as the wiper means 30 moves in a swivelling action and the terminal means 22 is disconnected and free to move in a circle. In other words, although in the embodiment illustrated the extended length A of the core element 20 moves in a plane as the control lever 24 moves, it may move in a conical area when the terminal means 22 is disconnected from the control member 24. During this movement the wiping means 30 moves in a swivelling motion.

The support member 14 of the guide means includes a male spherical end portion 34. The wiper means 30 comprises a female spherical member movably disposed upon the male end portion 34. The female spherical member comprising the wiper means 30 includes a circular opening 36 for receiving the male spherical portion 34, the circular opening 36 being smaller in diameter than the largest diameter of the male spherical portion 34. Thus, the female spherical member 30 may be snapped onto and retained on the male spherical portion 34.

The female spherical member 30 includes stop means for engaging the male spherical portion 34 for limiting swivelling movement of the female spherical member 30 relative to the male spherical portion 34. The male spherical portion 34 includes a flat end face 38 and the stop means includes a conical stop surface 40 within the female member 30. The conical surface 40 is directed toward an apex in the direction toward the flat end face 38. The conical stop surface 40 is spaced from the flat end face 38 when the extended length A of the core element 20 is coaxial with the remainder of the core element which is immediately within the support member 14 of the guide means. In other words, when the extended length of the core element 20 extends straight out of the end of the support member 14 of the guide means, the conical stop surface 40 of the female member 30 is spaced from the flat end face 38. On the other hand, the conical stop surface 40 in part engages the flat end face 38 for limiting spherical movement of the female member 30. As it will be appreciated, since the surface 40 is conical and the end face 38 is planar, only line contact or substantial line contact will occur between the two surfaces when limiting swivelling movement.

The male spherical portion 34 includes a passageway 42 through which extends the core element 20 immediately within the support member 14 of the guide means. The passageway 42 terminates adjacent the female spherical member 30 in a truncated outlet 44. The truncated outlet 44 facilitates or allows the uninhibited movement of the extended length A of the core element 20 in the conical area. In other words, the truncated outlet 44 is an enlarged portion of the passageway but tapered or funneled to allow the extended length A of the core element 20 to move angularly relative to an apex disposed in the passageway 42 without the core element engaging the inner passageway which could cause a sharp bend in the core element.

The female member 30 is generally cup-shaped and the wiper passage 32 surrounds the core element 20 and is in wiping engagement therewith to prevent foreign matter from passing to the interior of the female member and, consequently, into the interior of the guide means or passageway 42 thereof during reciprocating movement of the core element 20. The female member 30 includes a conical entry 46 which is coaxial with the wiper passage 32 and extends thereto and surrounding the core element 20 for facilitating the entry of the core element through the wiper passage 32 during installation. The wiper passage 32 is coaxial with the conical stop surface 40.

Similarly, the female member 30 includes a conical inlet 48 leading from the exterior of the female member 30 to the circular opening 36 for facilitating the entry of the male spherical portion 34 into the female member 30. The female member 30 is preferably made of an organic polymeric material which has sufficient resiliency to allow the female member 30 to be snapped onto the male spherical portion 34. As alluded to hereinabove, the male spherical portion 34 is integral with the support member 14 and is, therefore, also made of an organic polymeric or plastic material.

The embodiments of the invention in which an exclusive property or privilege is claimed are defined as follows:

1. A motion transmitting remote control assembly of the type for transmitting forces along a curved path by a motion transmitting core element, said assembly comprising; a guide means, a flexible motion transmitting core element movably supported by said guide means with a first end thereof extending from said guide means to provide a variable extended length of said core element between said guide means and said first end, terminal means disposed on said first end of said core element for operatively attaching said core element to a control member, and wiper means supported by said guide means for swivelling movement relative thereto and in wiping engagement with said core element for preventing foreign matter on said extended length of said core element from entering said guide means upon movement of said core element and whereby the axis of said extended length may move in a conical area as allowed by said swivelling movement, said guide means including a male spherical end portion and said wiper means comprising a female spherical member movably disposed on said end portion.

2. An assembly as set forth in claim 1 wherein said female spherical member includes a circular opening for receiving said male spherical portion and which opening is smaller in diameter than the largest diameter of said male spherical portion whereby said female spherical member may be snapped onto and retained on said male spherical portion.

3. An assembly as set forth in claim 2 wherein said female spherical member includes stop means for engaging said male spherical portion for limiting swivelling movement of said female spherical member relative to said male spherical portion.

4. An assembly as set forth in claim 3 wherein said male spherical portion includes a flat end face and said stop means includes a conical stop surface within said female member and directed toward an apex in the direction toward said flat end face, said conical stop surface being spaced from said flat end face when the axis of said extended length of said core element is coaxial with said core element immediately within said guide means and in part engages said flat end face for limiting said spherical movement.

5. An assembly as set forth in claim 4 wherein said male spherical portion includes a passageway through which said core element extends, said passageway terminates adjacent said female spherical member in a truncated outlet for facilitating the movement of said extended length of said core element in said conical area.

6. An assembly as set forth in claim 5 wherein said female member includes a conical inlet leading to said circular opening for facilitating the entry of said male spherical portion into said female member.

7. An assembly as set forth in claim 6 wherein said female member is cup-shaped and includes a wiper passage surrounding said core element.

8. An assembly as set forth in claim 7 wherein said wiper passage is disposed centrally and coaxial with said conical stop surface and said female member includes a conical entry coaxial with said wiper passage and extending thereto and surrounding said core element.

9. An assembly as set forth in claim 8 wherein said male spherical portion and said female member are made of organic polymeric material.

10. An assembly as set forth in claim 9 wherein said guide means includes a flexible conduit surrounding said core element and an end support member secured to said conduit, said end support member including attachment means for attachment to support structure, said end support member being made of organic polymeric material and said male spherical portion being integral therewith.

* * * * *